350-3.78 SR

XR 3,593,029

SEARCH ROOM

[redacted]

[11] 3,593,029

[72] Inventors Mitsuhito Sakaguchi;
Nobuo Nishida, both of Tokyo, Japan
[21] Appl. No. 878,142
[22] Filed Nov. 19, 1969
[45] Patented July 13, 1971
[73] Assignee Nippon Electric Company, Limited
Minato-ku, Tokyo, Japan
[32] Priority Nov. 27, 1968
[33] Japan
[31] 43/87218

[54] ANALOG TO DIGITAL CONVERTER WITH GRAPHIC DISPLAY EMPLOYING HOLOGRAPHIC TECHNIQUES
5 Claims, 3 Drawing Figs.

[52] U.S. Cl. ........................................ 250/219, 250/219 D, 340/324 R, 350/3.5
[51] Int. Cl. ........................................ G01n 21/30, G02b 27/00
[50] Field of Search ........................................ 350/3.5, 160 P; 250/219 D; 340/324

[56] References Cited
FOREIGN PATENTS
676,401 12/1963 Canada ........................ 350/160 P
OTHER REFERENCES
Zwieg, IBM TECHNICAL DISCLOSURE BULLETIN, Vol. 10, No. 6, Nov. 1967, p. 759 (Copy in 350/3.5)
Pennington et al., IBM TECHNICAL DISCLOSURE BULLETIN, Vol. 11, No. 7, Dec. 1968, pp. 820—821 (Copy in 350/3.5)

*Primary Examiner*—David Schonberg
*Assistant Examiner*—Ronald J. Stern
*Attorney*—Sandoe, Hopgood and Calimafde

ABSTRACT: A tablet device for use as a graphic display device includes a hologram plate on which interference patterns are selectively stored by irradiation of the plate by binary-code-modulated coherent light rays and a reference light beam. In a readout operation, the plate is irradiated by a thin light beam which produces first order diffraction light rays which denote the data stored in the irradiated area on the plate.

3593029
OR IN 350/550

PATENTED JUL 13 1971 3,593,029

*INVENTORS*
Mitsuhito Sakaguchi
Nobuo Nishida
*by*
Sandoe, Hopgood & Calimafde
ATTORNEYS

ANALOG TO DIGITAL CONVERTER WITH GRAPHIC DISPLAY EMPLOYING HOLOGRAPHIC TECHNIQUES

This invention relates generally to a computer-linked tablet device for use as a graphic display device and, more particularly, to a tablet device employing holographic techniques.

Paper tape readers, card readers, typewriters, line printers and the like are in common use as input equipment for computers. As the computers find diversified application in various fields, such as nonnumerical information processing and graphical pattern processing, so-called graphical display systems have been developed with a view toward achieving a more efficient communication between the computer and man.

The first system of this kind was described by I. E. Sutherland at the 1963 Spring Joint Computer Conference (See "-SKETCHPAD—A Man-Machine Graphical Communication System," Proceedings of SJCC, 1963). Since that time many attempts have been made to realize a high resolution graphic display system. One typical conventional system of this type utilizes a combination of a fine wire matrix, a light pen and a cathode-ray tube. Another such system employs a single cathode-ray tube and a light pen. The former is exemplified by the Rand Tablet developed by the Remington Rand Corporation and the latter by the CRT display device developed by the International Business Machine Corporation.

These conventional graphic display systems are arranged so as to convert the two-dimensional position of the tip of the light pen into two rectangular-coordinate-representing analog signals and then to digital signals. Therefore, in these systems, in order to achieve high resolution, the electrical circuits are inevitably complicated and costly to manufacture. Moreover, a cathode-ray tube, which is not suited for accurate display, is needed to visualize the trace of the tip of the light pen.

It is an object of the present invention to provide a novel tablet device employing holographic techniques in which electrical circuits are greatly simplified and no cathode-ray tube is needed. It is a further object of the invention to provide a computer visual display system having improved resolution.

According to the present invention, there is provided a hologram-type tablet device on which are photographically stored a number of elementary interference patterns each defining a spot in two dimensions. In the stage of forming the patterns, spatially binary-code-modulated laser light rays and a light-path-selected thin reference light beam are caused to successively irradiate the photographic plate. In a readout operation, the plate is irradiated by a thin reference light beam supplied from a light pen whose tip is maintained in contact with the surface of the plate. The irradiation brings out that particular one of the stored binary codes which designates the irradiated point, in the form of first order diffraction light rays.

To the accomplishment of the above and to such further objects as may hereinafter appear, the present invention relates to a tablet device employing holographic techniques as defined in the appended claims and as described in the following specification, taken in conjunction with the accompanying drawings in which:

Figure 1:
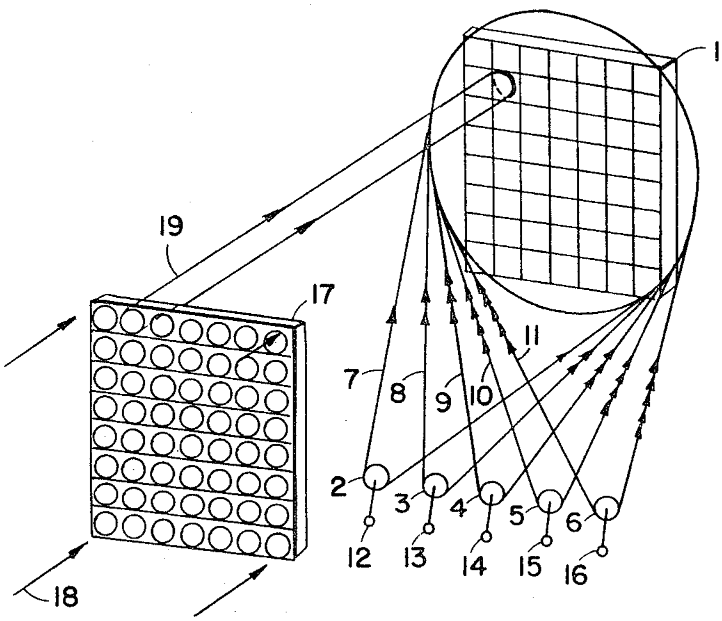
FIG. 1 is a perspective view in schematic form of an embodiment of the tablet device of the invention in its write phase.

Referring to FIG. 1, a photographic tablet in the form of a hologram plate 1 of the present invention is shown being irradiated by a plurality of diffused coherent light rays 7, 8, 9, 10, and 11 supplied from an array of point light sources 2, 3, 4, 5 and 6. On-off control of light sources 2—6 is carried out in response to a parallel binary signal respectively supplied at terminals 12, 13, 14, 15 and 16. A shutter such as in the form of a slidable masking plate 17 is interposed between a pencil of light rays 18 and plate 1 to permit only a portion 19 of the light rays to pass through plate 17 and onto plate 1.

In a write operation, a parallel binary signal is supplied to terminals 12, 13, 14, 15 and 16 to control the presence or absence of light beams 7—11 through the respective on-off states of the point light sources 2—6.

Shutter or masking plate 17 has a transparent aperture only at the point where the light rays 18 are to be allowed to pass through. Light beam 19 which has passed through the plate 17 irradiates plate 1 along with light beams 7—11 at the selected or designated point on plate 1. An interference pattern is thus formed and photographically stored at the designated point.

A saturable dye plate (not shown) may be disposed in front of plate 1 so as to allow only the simultaneous irradiation by the reference light beam 19 and the modulated light beams 7 to 11 to form the photographic image on the designated point on plate 1.

This process of forming the interference patterns is repeated until the entire surface of the plate 1 is covered with a predetermined number of elementary interference patterns arranged in lines and columns. Each of the elementary patterns represents an arbitrary number of binary digits for X and Y axes. More than 10 digits may be assigned to each of the X and Y coordinates, although only five diffused coherent light beams are shown in the embodiment. Since the apertures on the masking plate 17 can be made sufficiently fine by photographic techniques, the fineness or resolution of the elementary interference patterns is made far higher than the conventional display device employing a cathode-ray tube.

Figure 2:
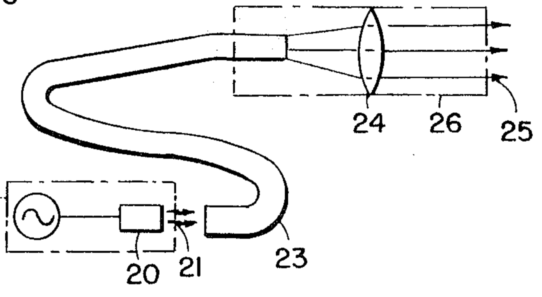
FIG. 2 is a longitudinal sectional view in schematic form of a light pen for use with the tablet device of FIG. 1.

Referring to FIG. 2, the light pen arrangement comprises a coherent light source 20 for generating a coherent light beam 21 in response to the excitation of an AC power source 22, coherent light source 20 and power source 22 being contained in a light source unit 31. The output light beam 21 is guided through a fibrous flexible light guide 23. At the other end of the fibrous light guide 23, a lens 24 is attached with its optical axis aligned with the axis of the light guide, for converting the transmitted light rays into a thin parallel light beam 25. The lens 24 is supported within a housing 26 which serves also as a hand grip. The plane defined by the opening end of the housing 26 is perpendicular to the optical axes of lens 24 and light guide 23.

Figure 3:
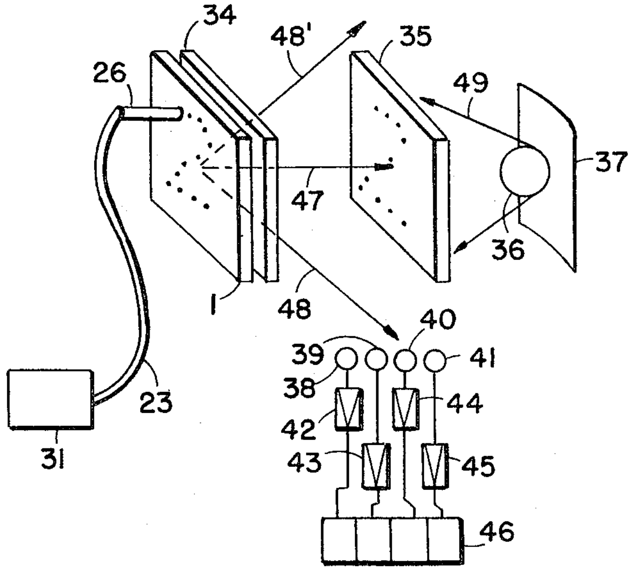
FIG. 3 is a perspective view in schematic form of the tablet device of FIG. 1 in its readout phase.

In the readout phase shown in FIG. 3, the light pen is arbitrarily manually caused to scan the hologram plate 1. The coherent light beam is supplied from the light source unit 31 through the fibrous light guide 23. During the irradiation of plate 1, the grip housing 26 is maintained perpendicular to the plate of hologram plate 1, so as to make the irradiation as fine as possible. The irradiation of plate 1 in this manner produces a nondiffraction (zero-order) component 47 and a pair of first order diffraction components 48 and 48′.

A photochromatic plate 35 is disposed near hologram plate 1 so as to be irradiated by the nondiffraction component 47. Plate 35 is also irradiated from behind by an ultraviolet light source 36 equipped with a parabolic reflector 37. As is known, photochromatic plate 35 turns opaque when it is irradiated by ultraviolet light rays, and only those portions of plate 35 which are irradiated with red or near infrared light rays turn transparent again. Owing to this property of the photochromatic plate, the irradiation of plate 35 by the nondiffraction component 47 brings out the trace of the movement of the light pen on the plate 35 as shown in FIG. 3. A suitable adjustment of the intensity of the ultraviolet light rays from source 36 and the coherent light rays from unit 31 makes it possible to produce a residual image on plate 35 of an arbitrary duration. To facilitate the control of the light ray intensities, a filter 34 may be disposed between hologram plate 1 and photochromic plate 35 for reducing the ultraviolet component coming into the possible light paths of the reference light rays.

An array of photodiodes 38, 39, 40, and 41 are disposed in the light path of the first order diffraction component 48. Each of these diodes is placed in spatial coincidence with each projected binary digit of the first order diffraction component 48 (another primary diffraction component 48′ may be left unutilized). The outputs of diodes 38—41 are respectively amplified by amplifiers 42—45 and are then supplied to a register 46, which in turn is supplied to a computer (not shown).

As will be understood from the foregoing, the movement of the tip of the light pen on the surface of the plate 1 is successively translated by the use of the first order diffraction component 48 into the change in the binary output at the register 46, while the trace of that movement is displayed on the photochromatic plate 35 by use of the nondiffraction component 47.

The masking plate 17 used in the write operation may be made of a plurality of nontransparent slides each having a single transparent aperture. For use in a high-precision printing operation, the apertures in these slides and their spacings can be made sufficiently small to produce the high-density elementary interference patterns on hologram plate 1. The masking plate 17 may also be composed of the combination of a plurality of polarization-rotating means and birefringent prisms.

The photochromatic plate 35 may be placed in contact with the filter plate 34, rather than being spaced therefrom as illustrated in FIG. 3.

The fibrous light guide 23 may be of the so-called clad type which has a core portion of a high refractive index and a covering layer of a lower refractive index. A fibrous light guide of light-converging property having such a refractive index which is highest along its longitudinal axis and decreases toward its surface, may be most favorable for use as the light guide 23. A converging light guide having these characteristics is described in copending U.S. Pat. application Ser. No. 806,368, assigned to the assignee of the present invention.

The present tablet device may be used not only in place of a conventional computer-linked graphic display device but also as a precision numerical control device suited for use in machine tools and the like.

While only a single embodiment of the present invention has been herein specifically disclosed, it will be apparent that variations may be made therein without departure from the spirit and scope of the invention.

We claim:

1. A system for providing a graphic display of an input analog signal and for converting the input analog signal to a corresponding binary signal, comprising a hologram plate having an array of elementary interference patterns stored thereon, each of said patterns being for converting said diffraction image into a corresponding binary signal, and means including a photochromic plate positioned substantially parallel to and adjacent said hologram plate for receiving said nondiffracted component on one surface thereof and means for directing ultraviolet radiation of the other surface thereof for displaying said nondiffracted component, thereby to form the graphic display of the locus of the beam produced by said irradiating means.

2. The device of claim 1, in which said irradiating means comprises a source of coherent light, flexible light guide means having an input end connected to the output end of said light source and focusing means connected to the output end of said light guide means for forming the coherent light from said source into said collimated light beam.

3. The device of claim 2, further comprising a housing containing said light beam directing means and the output end portion of said light guide means, said housing defining a grip for said irradiating means.

4. The device of claim 1, further comprising an ultraviolet filter interposed between said hologram plate and said photochromic plate.

5. The device of claim 1, in which said diffraction image converting means further comprises a shift register having a plurality of storage stages respectively connected to the outputs of said photoelectric converters.

UNITED STATES PATENT OFFICE
CERTIFICATE OF CORRECTION

Patent No. 3,593,029 Dated July 13, 1971

Inventor(s) Mitsuhito Sakaguchi et al.

It is certified that error appears in the above-identified patent and that said Letters Patent are hereby corrected as shown below:

Column 4, line 10, after "being" insert -- formed by interference between light from a group of on-off modulated coherent point light sources representing the coordinate of the location at which a particular interference pattern is stored in said array and a collimated reference light beam mutually coherent with the light from said modulated point sources, means for irradiating said hologram plate with a collimated coherent light beam in a direction substantially perpendicular to the plane of said hologram plate and having a cross-sectional area no greater than the area of any one of said elementary interference patterns, said irradiating beam being moveable in accordance with the input analog signal in a direction parallel to the plane of said hologram plate, thereby to produce a diffraction image of said modulated point light sources and a non-diffracted light beam component, means including a plurality of photoelectric converters disposed at the position of said diffraction image --.

Signed and sealed this 29th day of August 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334